United States Patent
Yang et al.

(10) Patent No.: US 7,355,598 B2
(45) Date of Patent: Apr. 8, 2008

(54) SYSTEM AND METHOD FOR FAST GENERATION OF HIGH-QUALITY MAXIMUM/MINIMUM INTENSITY PROJECTIONS

(75) Inventors: Lining Yang, East Windsor, NJ (US); Min Xie, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 207 days.

(21) Appl. No.: 11/159,004

(22) Filed: Jun. 22, 2005

(65) Prior Publication Data

US 2005/0286748 A1      Dec. 29, 2005

Related U.S. Application Data

(60) Provisional application No. 60/583,223, filed on Jun. 25, 2004.

(51) Int. Cl.
*G06T 17/00* (2006.01)

(52) U.S. Cl. .............. 345/420; 345/422; 345/424; 345/426; 345/440; 345/503; 382/128; 382/274

(58) Field of Classification Search ........ 345/420, 345/422, 424, 426, 440, 503; 382/128, 274
See application file for complete search history.

(56) References Cited

U.S. PATENT DOCUMENTS 5,566,282 A * 10/1996 Zuiderveld ............. 345/424
6,587,110 B1 * 7/2003 Kunimatsu et al. ....... 345/502

* cited by examiner

*Primary Examiner*—Kimbinh T. Nguyen (57) ABSTRACT

A method for rendering a volumetric image includes providing a digitized volumetric image comprising a plurality of intensities corresponding to a domain of points in a 3-dimensional space, casting a ray through said volumetric image for a first pass to determine a threshold intensity for said ray, casting said ray through said volumetric image for a second pass, and sampling only those points whose intensity value is selected by said threshold intensity to determine a rendering value for said ray, wherein said rendering value is associated with a pixel from which said ray was cast.

29 Claims, 8 Drawing Sheets

|  | Brute-force Method | Two-pass algorithm |
|---|---|---|
| Rendering Speed (ms) | 2364-9842 | 489-1042 |
| Interpolation Ratio | 100% | 4.48-4.97% |

```
for each ray do
        determine initial maxValue from first pass
        maxValue = get_node_max ( node, maxValue) // second pass
        store maxValue in pixel from which ray was cast
next ray get_node_max( node, val) begin
        for each node do
                if node.sub !=null
                then
                        if node.max>val
                        then
                                val=get_node_max( node.sub, val)
                        end
                else
                        sample = trilinterp ( node)
                        val=max ( sample, val)
                end
        next node
        return val
end
```

SYSTEM AND METHOD FOR FAST GENERATION OF HIGH-QUALITY MAXIMUM/MINIMUM INTENSITY PROJECTIONS

CROSS REFERENCE TO RELATED UNITED STATES APPLICATIONS

This application claims priority from "Fast Generation of High-Quality Maximum/Minimum Intensity Projection", U.S. Provisional Application No. 60/583,223 of Lining Yang, et al., filed Jun. 25, 2004, the contents of which are incorporated herein by reference.

TECHNICAL FIELD

This invention is directed to volume rendering techniques for extracting structures from digital medical images.

DISCUSSION OF THE RELATED ART

Maximum Intensity Projection (MIP) is a known volume rendering technique that is used to extract high-intensity structures from volumetric scalar data, such as a digital medical image. MIP is typically performed as part of a ray casting algorithm, wherein for each pixel of the display device, a ray is cast into the volumetric dataset, and the maximum interpolated value along the ray is selected. At each voxel along the viewing ray, the highest sample value encountered is determined. MIP is commonly used in angiography to extract vascular structures from medical CT or MRI data sets. Alternatively, the volume rendering technique known as Minimum Intensity Projection (MinIP) is used to extract low-intensity structures from volumetric scalar data. At each voxel along a viewing ray the lowest data value encountered is determined. MinIP is often used for rendering lungs and airways. MIP and MinIP are complementary methods from an algorithmic point of view. By reversing the maximum and minimum these algorithms are mirror symmetric.

MIP is intrinsically expensive because it must visit all voxels along the viewing ray to find the maximal value. Common volume rendering acceleration techniques such as space leaping and early ray termination cannot be applied to MIP. Also, high image quality is achieved by sampling along the ray using tri-linear interpolation, which is a time consuming operation requiring 8 none-contiguous voxel accesses, 7 multiplications and 14 additions to compute a sample. To render a $512^3$ voxel CT image dataset, one needs to perform 2 gigabytes of non-contiguous memory access, nearly 1 billion multiplications and 2 billion additions. A brute force high-quality MIP for a $512^3$ dataset takes about 9-10 seconds on a dual Xeon 3.0 GHZ Dell 450 workstation, which makes it difficult to achieve interactive rendering speed for a high-quality MIP.

SUMMARY OF THE INVENTION

Exemplary embodiments of the invention as described herein generally include methods and systems for reconstructing a Maximum or Minimum Intensity Projection (MIP/MinIP) using a Multi-Resolution Space Advancing algorithm and a Two-Pass Searching algorithm. The Multi-Resolution Space Advancing algorithm allows a fast skipping of the "empty space" along the ray with minimal overhead, and is disclosed in these inventors' patent, "System and Method for Fast Volume Rendering", U.S. Pat. No. 7,242,401, which was filed as an application concurrently herewith. The Two-Pass searching algorithm uses the Multi-Resolution Space Advancing algorithm to reduce the number of tri-linear interpolations required for a high quality MIP/MinIP by more than 95%. As a result, MIP/MinIP rendering performance is up to 10 times faster without any degradation in image quality and resolution. Interactive performance can be achieved for relatively large dataset without using any special graphics hardware for acceleration.

According to an aspect of the invention, there is provided a method for rendering a volumetric image including the steps of providing a digitized volumetric image comprising a plurality of intensities corresponding to a domain of points in a 3-dimensional space, casting a ray through said volumetric image for a first pass to determine a threshold intensity for said ray, casting said ray through said volumetric image for a second pass, and sampling only those points whose intensity value is selected by said threshold intensity to determine a rendering value for said ray, wherein said rendering value is associated with a pixel from which said ray was cast.

According to a further aspect of the invention, the method comprises imposing a reduced path octree structure on said volumetric image, said reduced path octree comprising a plurality of first level nodes, wherein each first level node contains a plurality of image points, wherein each node includes a minimum intensity value and a maximum intensity value.

According to a further aspect of the invention, the first pass comprises visiting each first level node along said ray to find a extremal intensity value, and visiting each point in a first level node containing said extremal intensity value to find a bounding value, wherein said threshold is said bounding value.

According to a further aspect of the invention, the extremal value is a maximum value, and said bounding value is a largest minimum value.

According to a further aspect of the invention, the extremal value is a minimum value, and said bounding value is a smallest maximum value.

According to a further aspect of the invention, the method comprises sampling each point in said first level node containing said extremal intensity value using tri-linear interpolation.

According to a further aspect of the invention, the second pass comprises visiting each first level node along said ray, wherein if an extremal intensity value for said first level node is selected by said threshold, visiting each point within said first level node.

According to a further aspect of the invention, the method comprises sampling each point visited within each first level node, and saving an extremal value of each sample of each visited point.

According to a further aspect of the invention, the extremal value is a minimum value, and an intensity value is selected by said threshold if said intensity is less than said threshold.

According to a further aspect of the invention, the extremal value is a maximum value, and an intensity value is selected by said threshold if said intensity is greater than said threshold.

According to a further aspect of the invention, sampling comprises tri-linear interpolation.

According to a further aspect of the invention, the rendering value for said ray is an extremal value of all samples of each first level node visited along said ray.

According to a further aspect of the invention, the reduced path octree comprises a plurality of second level nodes, wherein each second level node contains a plurality of first level nodes, and wherein said second pass comprises visiting each second level node along said ray, wherein if an extremal intensity value for said second level node is selected by said threshold, visiting each first level node within said second level node.

According to another aspect of the invention, there is provided a program storage device readable by a computer, tangibly embodying a program of instructions executable by the computer to perform the method steps for rendering a volumetric image.

DETAILED DESCRIPTION OF THE PREFERRED EMBODIMENTS

Exemplary embodiments of the invention as described herein generally include systems and methods for reconstructing a Maximum or Minimum Intensity Projection (MIP/MinIP) using a Multi-Resolution Space Advancing algorithm and a Two-Pass Searching algorithm. Since the MIP and MinIP are complementary methods, the embodiments described herein invention will be discussed in term of a MIP. It is to be understood that these embodiments can be applied to a MinIP by those skilled in the art.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Ray casting is a process that, for each pixel in an image volume to be rendered, casts a single ray from the eye through the center of the pixel and into the volume, integrating optical properties, such as opacity, obtained from the encountered volume densities along the ray path. Two modes of ray casting are direct volume rendering DVR) and shaded surface display (SSD). In many imaging modalities, such as CT or MRI, the resulting intensity values or ranges of values can be correlated with specific types of tissue, enabling one to discriminate, for example, bone, muscle, flesh, and fat tissue, nerve fibers, blood vessels, organ walls, etc., based on the intensity ranges within the image. The raw intensity values in the image can serve as input to a transfer function whose output is an opacity value that can characterize the type of tissue. These opacity values can be used to define a look-up table where an opacity value that characterizes a particular type of tissue is associated with each pixel point. The optical properties being integrated by a ray can be obtained for a pixel from the look-up table. The use of opacity values to classify tissue enables a user to select an object or tissue type to be displayed and only integrate opacity values corresponding to the selected object or tissue.

Space-leaping techniques used in Direct Volume Rendering (DVR) and Shaded Surface Display (SSD) rendering modes generally skip "empty space" without sampling. The multi-resolution space advancing methods disclosed in these inventors' copending application, "System and Method for Fast Volume Rendering", can accelerate MIP/MinIP rendering, by selecting only one sample on each ray as the voxel value for MIP/MinIP. If nodes in a Reduced Path Octree can be marked as "empty", meaning lower than a threshold value, the majority of space in an image volume can also be skipped without sampling. The performance of MIP could be equal to or even exceed that of the DVR/SSD rendering modes.

Figure 9:
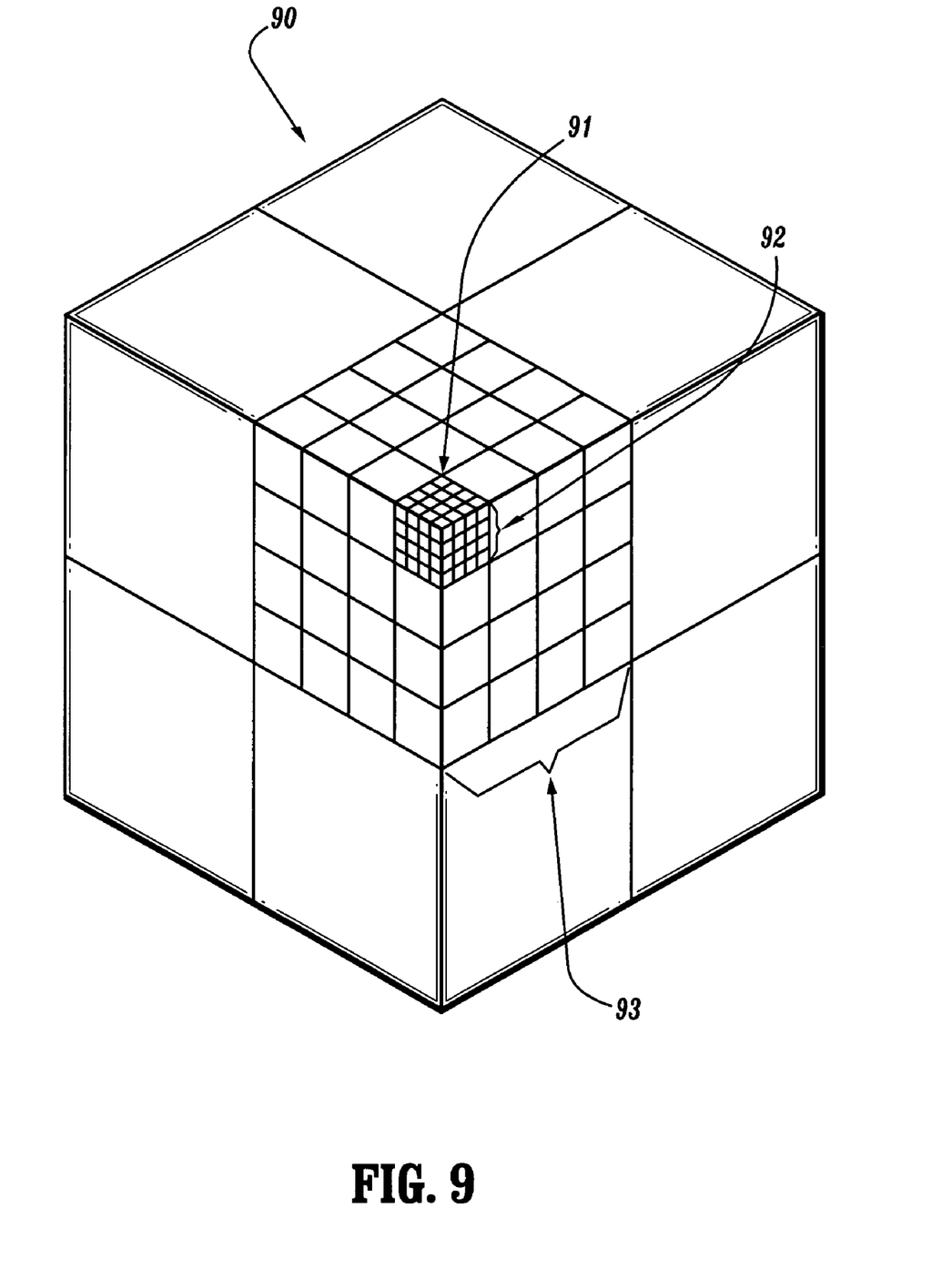
FIG. 9 illustrates an exemplary reduced path octree, according to an embodiment of the invention.

According to an embodiment of the invention, a reduced path octree data structure is depicted in FIG. 9. In a reduced path octree, the number of intermediate layers have been reduced. The non-limiting example depicted in FIG. 9 is a two layer octree having a lower level with 4×4×4 nodes and an upper level with 16×16×16 nodes. Each 4×4×4 node 92 is associated with a list of the 64 voxels 91 contained therein, while each 16%16%16 node 93 is associated with the 64 4×4×4 nodes 92 contained therein. The entire image volume 90 comprises 2×2×2 nodes 93 of size 16×16×16. Associated with each node at each level is a minimum and maximum value of all the nodes/voxels contained within the node. Reducing the number of intermediate layers reduces the additional memory needed by the data structure, and reduces the complexity of the indexing. Each layer can be treated as a sub-sampled volume and the indexing relationship between different layers for the corresponding nodes is implicit with no additional required pointers. For example, considering a 512×512×512-cube dataset and a voxel with the (x, y, z) position being (240, 36, 410), the corresponding node location in the 4×4×4 layer is (60, 9, 102) and the corresponding node location in the 16×16×16 layer is (15, 2, 25). Note that the division by 4 with truncation can be efficiently computed via right shifting by two bits. More generally, the conversion of an upper level index to a lower level index can by accomplished by right shifting the upper level index by an appropriate number of bits.

Figure 1:
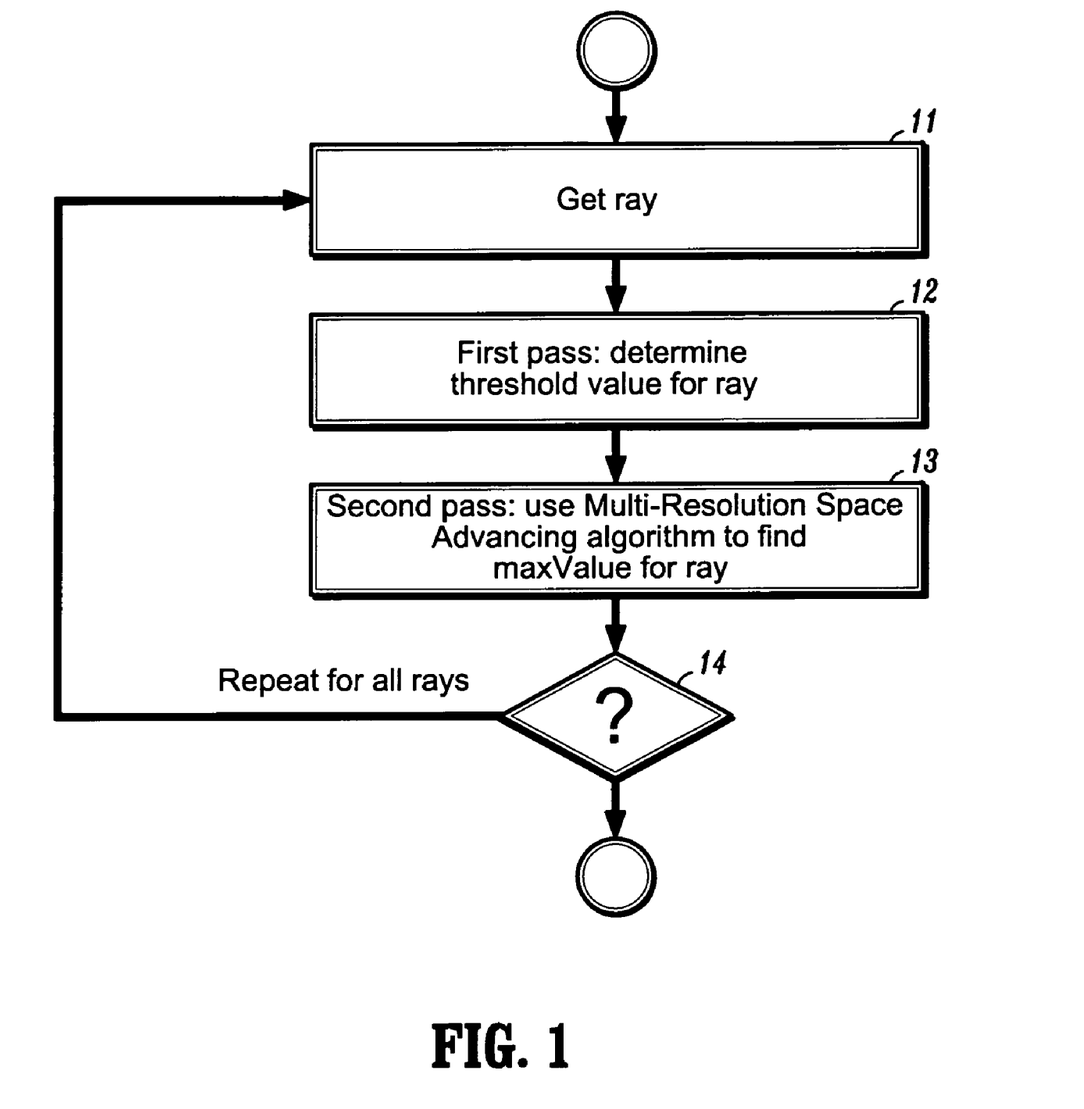
FIG. 1 depicts a flowchart of an exemplary MIP method according to an embodiment of the invention.

FIG. 1 depicts a flowchart of an exemplary Min-Max Reduced path Octree method according to an embodiment of the invention. An exemplary Min-Max Reduced path Octree method includes two passes for each ray. A first ray is selected at step 11. At step 12, a first pass through the ray finds an initial threshold. A second pass, at step 13, uses a Multi-Resolution Space Advancing algorithm to assist a fast marching along the ray. This pass can quickly skip the "empty space" that is excludes by the threshold. With an appropriate threshold, few nodes are selected by the threshold and are sampled with tri-linear interpolations. Only those nodes selected by the threshold are sampled by the ray, and a sample extreme value is saved as the rendering value for each ray. If a MIP is being performed, nodes whose intensity exceeds the threshold are sampled, and the sample maximum is saved. If a MinIP is being performed, nodes whose intensity is less than the threshold are sampled, and the sample minimum is saved. At step 14, the next ray is selected, and steps 13 and 14 are repeated until all rays have been cast.

For the purpose of clarity, and without loss of generality, a Min-Max Reduced Path Octree structure that includes two levels, 4×4×4 and 16×16×16, will be described. The use of these 4×4×4 and 16×16×16 nodes is exemplary and non-limiting, and it is to be understood that different sized nodes can be used and be within the scope of an embodiment of the invention. In addition, it is to be understood that a Reduced Path Octree structure can include more than the two levels described here and still be within the scope of an embodiment of the invention.

Figure 2:
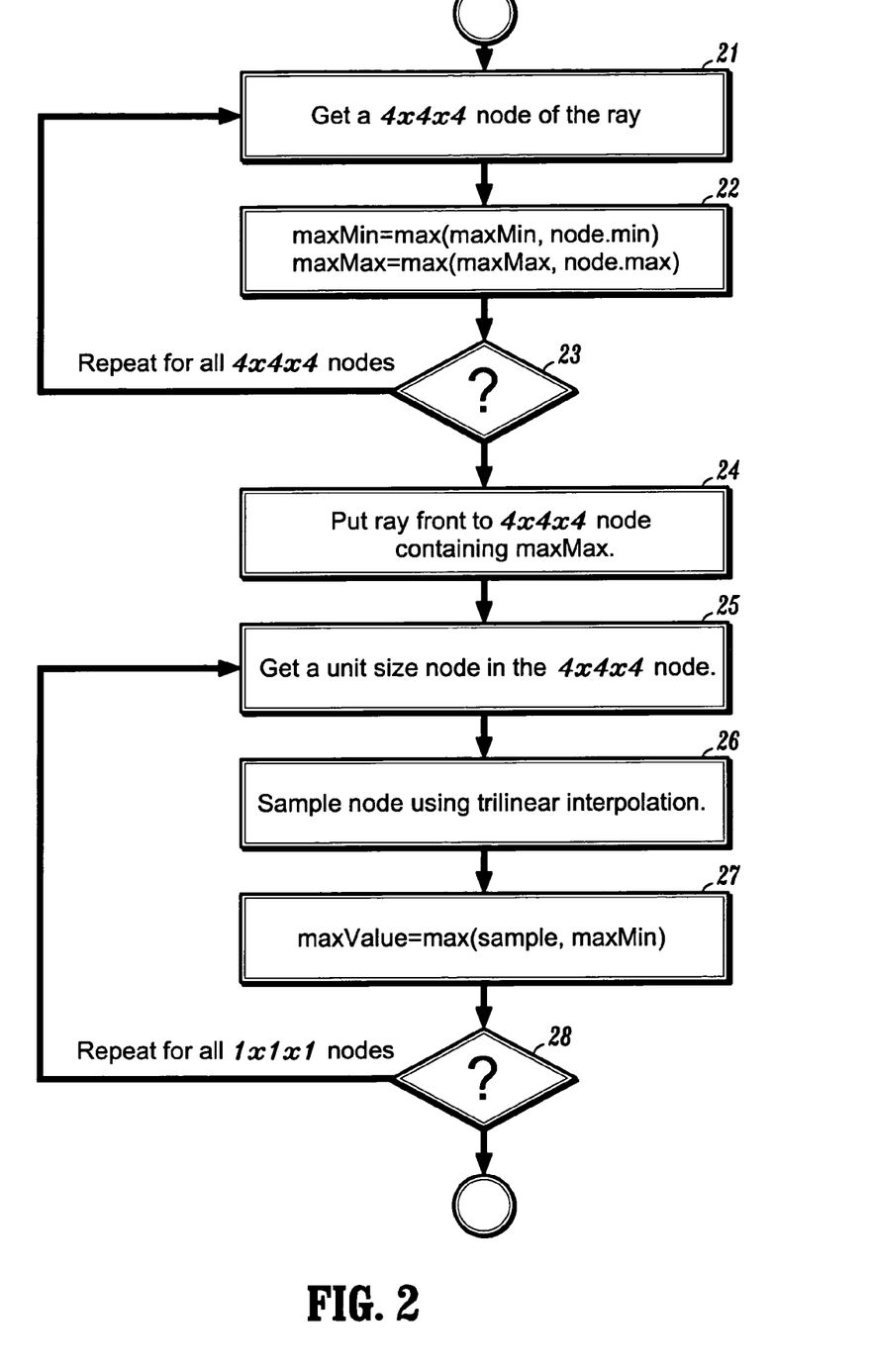
FIG. 2 depicts a flow chart of a first pass of a MIP method according to an embodiment of the invention.

FIG. 2 depicts a flow chart of a first pass of a MIP method according to an embodiment of the invention. The exemplary first pass depicted in FIG. 2 uses a first level comprising 4×4×4 nodes. This first pass starts, at step 21, at the first node along the ray, and uses the minimum and maximum values stored for each node. At step 22, the maximum of each node minimum value and the maximum of each node maximum values is determined. At step 23, the next node along the ray is visited, so that all nodes along the path of each ray are traversed. If the raycast sampling step size is of unit step size, the step size for this first pass is four. The maximum node minimum value and the maximum node maximum value are referred to herein as maxMin and maxMax, respectively. Then, at step 24, the ray front is placed at the 4×4×4 node whose maximum value is max-Max, and this node is sampled with a unit step size. The first unit size node in the 4×4×4 node is obtained at step 25, and trilinear interpolation is used at step 26 to determine the sample value for this. A maximum of the node sample is determined at step 27. If the sample is greater than maxMin, the sample is saved as a maximum value, otherwise the maximum value is taken to be maxMin. This maximum value is referred to as maxValue and can be used as the initial threshold for the second pass. At step 28, the ray front is incremented by one to obtain the next node along the ray, and the preceding steps are repeated until all nodes along the ray have been visited. The first pass can be performed quickly since the step size is four in the 4×4×4 sub-volume case and only 4 trilinear interpolations are performed for each ray.

Again, if a MinIP is being performed, the first stage would determine a minimum of each node maximum, and a minimum of each node minimum, denoted herein by minMax and minMin, respectively. For the second stage, the ray front would be placed at the 4×4×4 node whose minimum value is minMin, and the minimum value would be compared to minMax, and would be saved if less than minMax. This minimum value, denoted herein by minVal, would serve as the threshold for the next pass.

Figure 3:
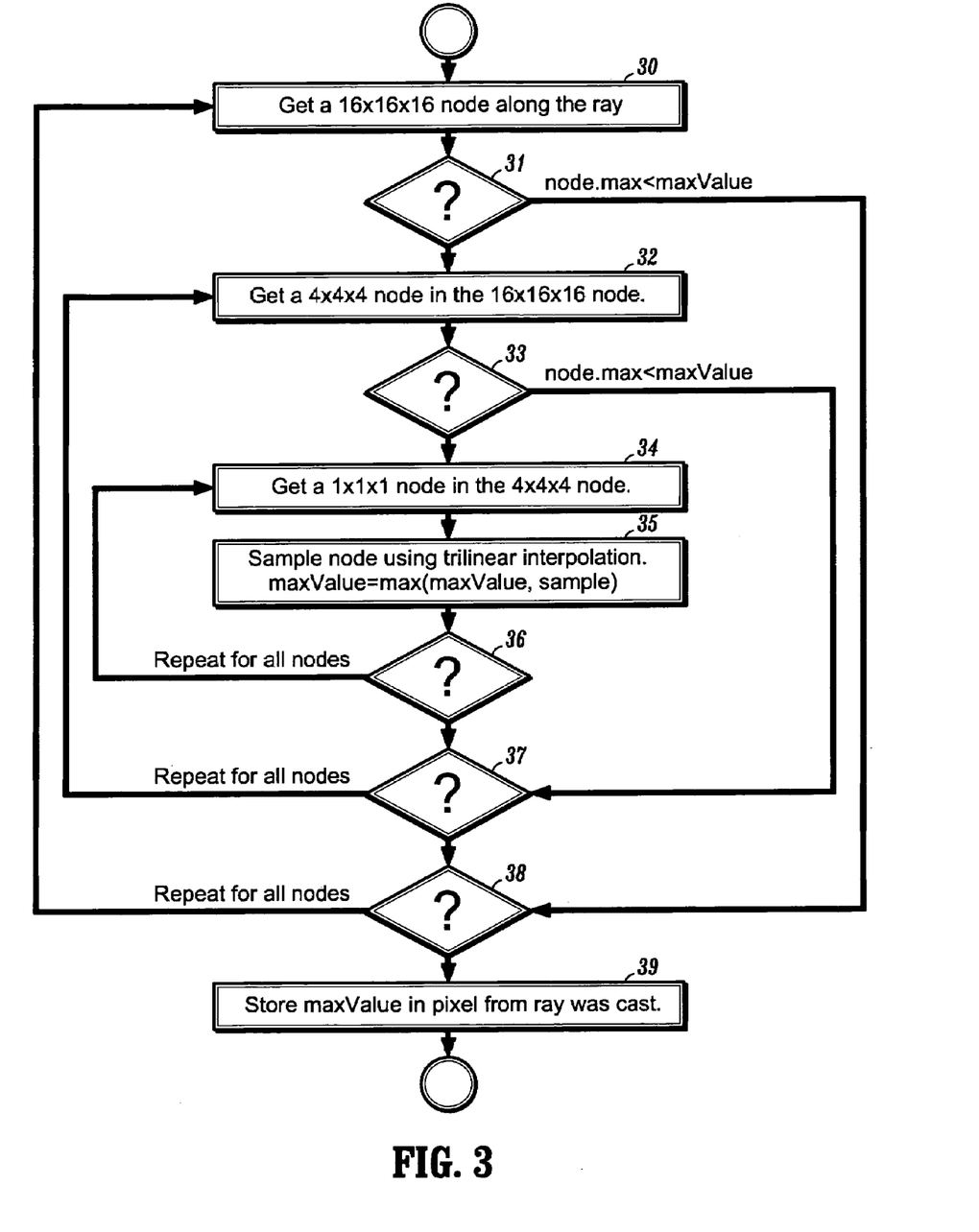
FIG. 3 depicts a flow chart of a second pass of a MIP method according to an embodiment of the invention.

FIG. 3 depicts a flow chart of a second pass of a MIP method according to an embodiment of the invention. According to an embodiment of the invention, the second pass uses the maxValue as an initial threshold in a Reduced Path Octree. In a non-limiting example described herein, a Min-Max Reduced Path Octree structure that includes two levels, 4×4×4 and 16×16×16, is used. The pass starts at the first 16×16×16 node along the ray at step 30. If, at step 31, the maximum of this 16×16×16 node is less than the threshold, the node is considered to be empty and can be skipped. The process jumps to step 38 to advance to the next 16×16×16 node. If the 16×16×16 node is not empty, then a first level lower node, such as the 4×4×4 level nodes within the parent 16×16×16 node, is visited at step 32, and the step size is reduced to four. Again, if at step 33, the maximum of this 4×4×4 node is less than the threshold, the node is considered to be empty and can be skipped. The process jumps to step 37 to advance to the next 4×4×4 node. If the 4×4×4 node is not empty, then a next level lower node, such as the 1×1×1 level nodes within the parent 4×4×4 node, is visited at step 34, and the step size is reduced to one. At step 35, the node is sampled using tri-linear interpolation, and a maximum value of the samples and the threshold is determined. If the sample is smaller than the threshold, the sample value is discarded, otherwise max Value is replaced with the new sample value. At step 36, the next 1×1×1 node is visited until all 1×1×1 nodes in the 4×4×4 node have been visited. The step size is now increased back to four and the next 4×4×4 node is visited at step 37, and the preceding steps 33, 34, 35, and 36 are repeated. After all the 4×4×4 nodes within the specific 16×16×16 node are processed, the step size is increased to sixteen and the next 16×16×16 node is visited at step 38. The preceding steps 31, 32, 33, 34, 35, 36, and 37 are repeated for all 16×16×16 nodes along the ray, and the final maxValue is stored at step 39 in the pixel from which the ray was cast.

By repeating the steps of the first and second pass for each ray, a final image can be rendered.

In the case of a MinIP, nodes would be sampled if the node minimum is less than minVal, and the minimum value of the sampled nodes would be saved as the rendering value for the ray.

Figure 8:
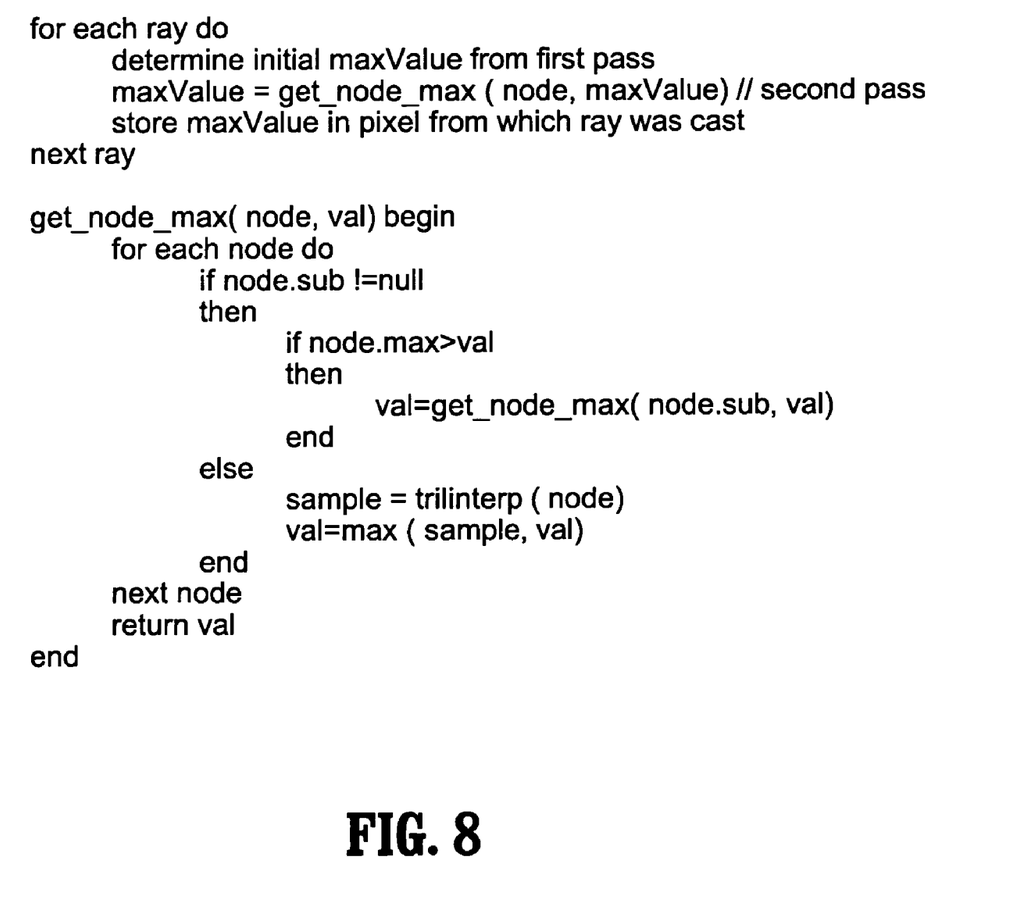
FIG. 8 presents pseudo-code for an exemplary recursive implementation of a two pass MIP method according to an embodiment of the invention.

The use of a two-level Min-Max Reduced Path Octree is exemplary, and according to another embodiment of the invention, an Octree structures with an arbitrary number of levels can be used. FIG. 8 depicts pseudo-code for an exemplary, non-limiting recursive implementation of a second pass of a MIP method according to this embodiment of the invention. For each ray, the initial max-Value is determined from the first pass. Then for the second pass, a recursive function get_node_max is invoked with the current node and maxValue as arguments, to determine the max-Value for that ray. For each non-empty node, the next lower level node, indicated as node.sub in the pseudo-code, is visited until the lowest level nodes are reached, at which point each of the lowest level nodes are sampled using trilinear interpolation, and the samples are compared to the threshold to update maxValue.

Similarly, according to another embodiment of the invention, an octree with one level can be used. In this embodiment, the outermost node loop depicted in FIG. 3 would be eliminated, and each unit sized node would be sampled if an outer level node maximum (minimum) value is greater than (less than) the threshold.

Figure 4:
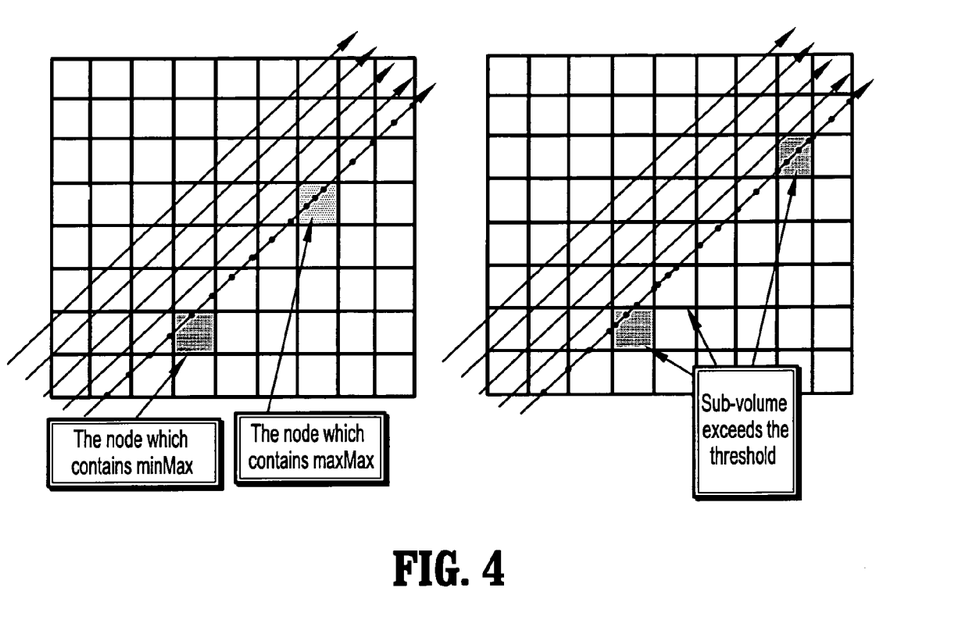
FIG. 4 is a schematic diagram illustrating an exemplary two pass algorithm for fast MIP generation, according to an embodiment of the invention.

FIG. 4 is a schematic diagram illustrating an exemplary two pass algorithm for fast MIP generation, according to an embodiment of the invention. The left side of FIG. 4 presents an exemplary first pass. By way of example, samples are indicated for the right hand ray by dots along the ray. A node containing minMax is indicated by the shaded box on the left side, while a node containing maxMax is indicated by the shaded box on the right side. The right side of FIG. 4 presents an exemplary second pass. For the sake of clarity in the figure, only one level of an Octree, a 4×4 node, is depicted. The shaded boxes represent nodes whose sample value exceeds the threshold. Only the shaded boxes are visited during the second pass.

The improved performance of the embodiments of the invention described above comprises two sources. First, by using a Multi-Resolution Space Advancing algorithm, empty space can be skipped faster than in a space leaping based ray-casting algorithm. The large variable step sizes can improve the rendering performances. Secondly, the 2-pass searching algorithm reduces the number of tri-linear interpolations. A brute force MIP algorithm requires resampling of the entire volume using tri-linear interpolation, while in a method according to an embodiment of the invention, only those voxels whose parent nodes exceed a growing threshold are interpolated. Furthermore, a method according to an embodiment of the invention can avoid node-leaking that can result from a simple ray marching using a Reduced Path Octree, as disclosed in these inventors' copending application, "System and Method for Fast Volume Rendering".

Figure 5:
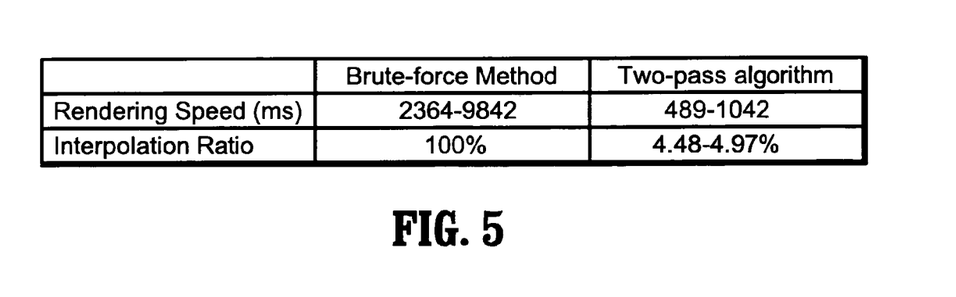
FIG. 5 is a table comparing the rendering speed and interpolation for a 512×512×512 CT scanned head dataset between a brute force method and a method according to an embodiment of the invention.

Experiments indicate that the number of actual interpolations of a method according to an embodiment of the invention can be as little as 5% of the number of interpolations performed by a brute force algorithm. Similarly, the performance of a method according to an embodiment of the invention can be up to 10 times faster than a brute force method for a typical 512×512×512 volume. FIG. 5 is a table comparing the rendering speed and interpolation for a 512× 512×512 CT scanned head dataset between a brute force method and a method according to an embodiment of the invention. The first row in the table presents rendering speed data in milleseconds, and it can be seen that a brute force algorithm take from about 5 to about 10 times longer to perform the rendering. The second row in the table presents data on the number of interpolations performed, and indicated that the number of interpolations performed by a two pass algorithm according to an embodiment of the invention was about 5% of the number performed by the brute force method. Since the performance depends on the viewing angle, the table presents a range of performance figures based on different viewing angles. The data presented in FIG. 5 was based on an experiment performed on a dual Xeon 3.0 GHZ Dell 450 workstation with 1 GB of system memory. A conventional high-quality MIP for this dataset takes about 9 to 10 seconds to render while a method according to an embodiment of the invention can achieve about 1 frame per second at full resolution, and about 10 frames per second at a reduced resolution.

Figure 6:
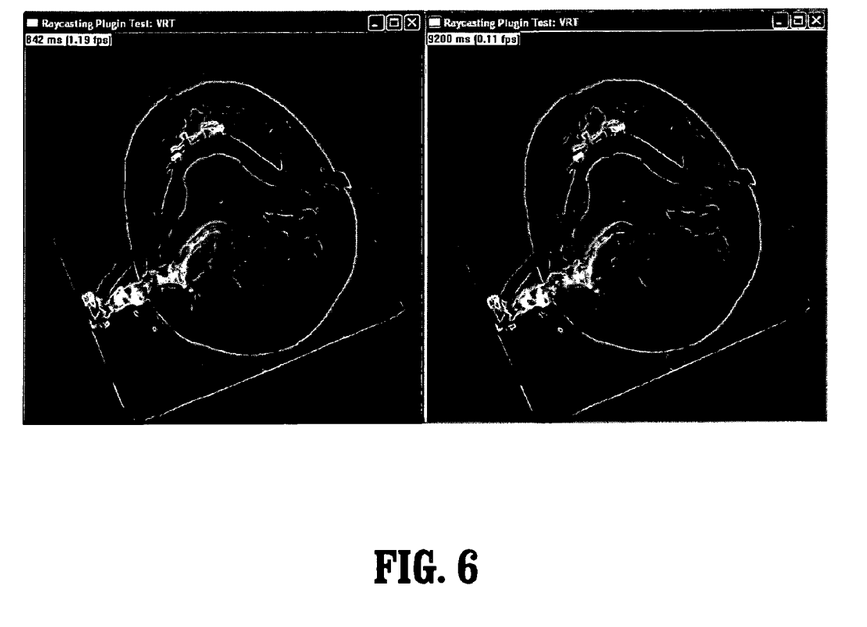
FIG. 6 depicts side-by-side images comparing MIP generation using a brute force method and a method according to an embodiment of the invention.

FIG. 6 shows the side by side comparison of an image produced by a method according to an embodiment of the invention, and an image produced by a brute force algorithm for the same dataset. The left panel of FIG. 6 depicts an image produced by a method according to an embodiment of the invention, while the right panel depicts an image produced by a brute force method. No image quality degradation is detected.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
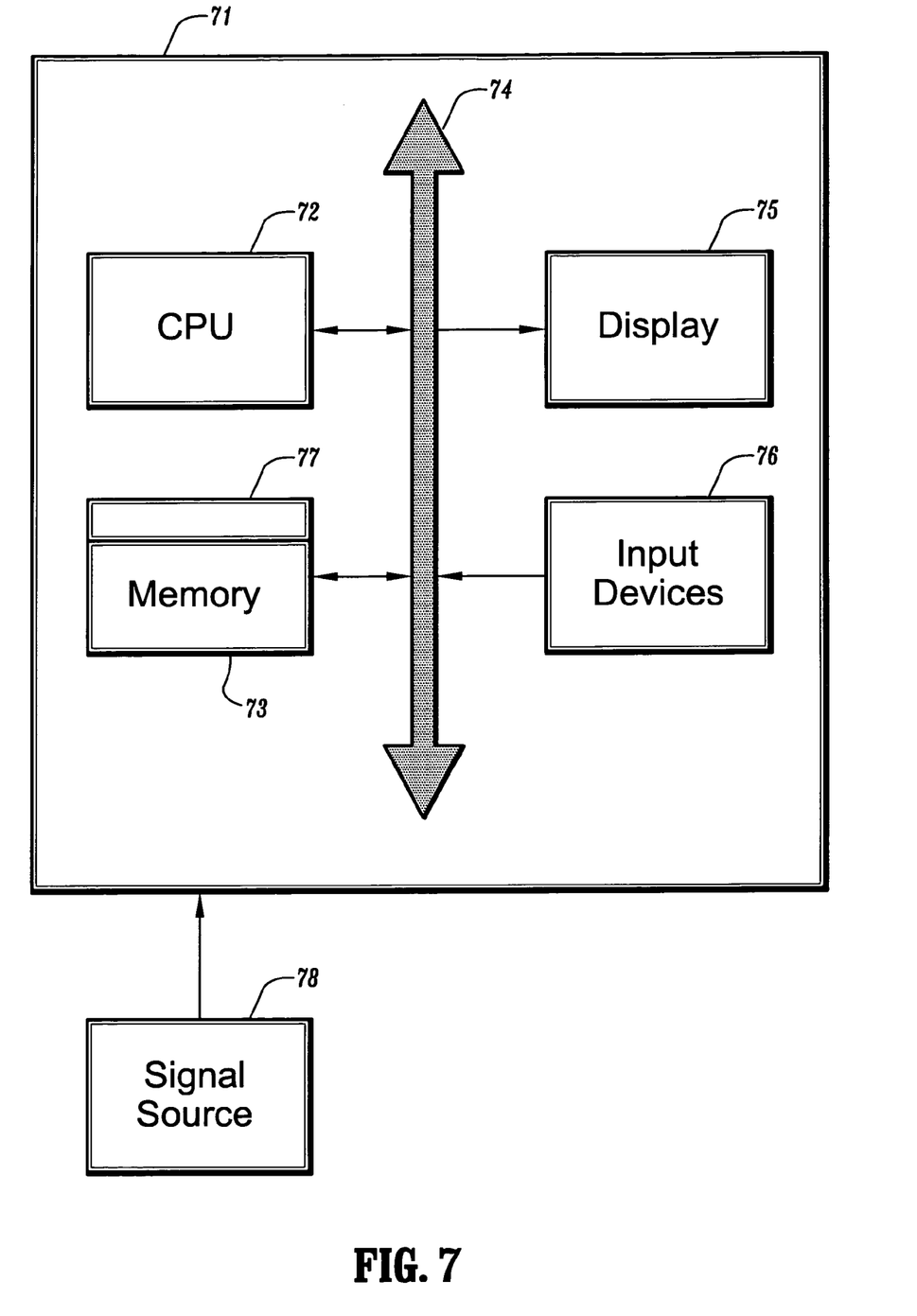
FIG. 7 is a block diagram of an exemplary computer system for implementing a two-pass method according to an embodiment of the invention.

Referring now to FIG. 7, according to an embodiment of the present invention, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for performing volume rendering, comprising:

providing a digitized volumetric comprising a plurality of intensities corresponding to a domain of voxels in a 3-dimensional space and a color/alpha channel lookup table;

performing a pre-processing step, said preprocessing step comprising constructing a Reduced Path Octree data structure;

generating a 2-D image by casting a ray from each pixel of the image into the volume;

casting the ray through the Reduced Path Octree for a first pass to determine a threshold, wherein said first pass comprises visiting each first level node along said ray to determine a first pass extremal intensity value and the position of the node that contains the extremal value;

casting the ray through the volumetric image for a second pass;

visiting each level of the Reduced Path Octree node and determining the emptiness of nodes at each level during the advancing of the ray in the second pass;

sampling along the ray inside only the non-empty region and skip the empty region; and determining a rendering value for the ray, wherein said rendering value is a second pass extremal value associated with a pixel from which said ray was cast.

2. The method of claim 1, wherein said first pass extremal value is a maximum of all the nodes minimum values.

3. The method of claim 1, wherein said first pass extremal value is a minimum of all the nodes maximum values.

4. The method of claim 1, wherein said second pass extremal value is a maximum of all the interpolated samples along the ray.

5. The method of claim 1, wherein said second pass extremal value is a minimum of all the interpolated samples along the ray.

6. The method of claim 1, further comprising:
sampling each sample inside the node that contains said first pass extremal value using tri-linear interpolation and determining a new first pass extremal value.

7. The method of claim 1, wherein the first pass extremal value is used as the threshold for a following pass.

8. The method of claim 1, further comprising:
providing an adaptive ray sampling algorithm for the Reduced Path Octree during the second pass.

9. The method of claim 8, further comprising:
visiting each nth level Reduced Path Octree node along said ray, wherein the step size of the ray sampling corresponds to the size of the node of the nth level Reduced path Octree;

visiting each lower level node contained therein along said ray if the nth level node is not empty and reducing the sampling step size to the size of node;

repeating the steps of visiting each next lower level and changing the sampling step size accordingly until a voxel level is reached; and interpolating each sample and compositing the sample into the rendering of said image.

10. The method of claim 9, wherein a node is empty if said maximum value of the node is less than a predetermined threshold value in the first pass.

11. The method of claim 9, wherein a node is empty if said minimum value of the node is larger than the predetermined threshold value in the first pass.

12. The method of claim 9, wherein visiting each nth level Reduced Path Octree node further comprises determining the emptiness of the current node and its neighboring nodes to avoid skipping a non-empty neighboring node using said larger than unit step size.

13. The method of claim 9, wherein visiting each nth level Reduced Path Octree node further comprises advancing the ray using the step size corresponding to said level, if both the neighboring nodes and the current node are empty.

14. The method of claim 9, further comprising:
visiting the node in the next lower level and reducing the ray step size corresponding to the next lower level, if the current node is empty but the neighbor nodes are not empty.

15. The method of claim 9, further comprising:
looping through the node using said ray step size without interpolation; and compositing if
the next lower level is at the voxel level, until the ray exits the node.

16. The method of claim 9, further comprising visiting the node in the next lower level and reducing the ray step size corresponding to the next lower level, if the current node is not empty.

17. The method of claim 16, further comprising:
interpolating the samples along the said ray using tri-linear interpolation if the next lower level is at the voxel level.

18. The method of claim 17, further comprising:
updating the second pass extremal value if the interpolated value is larger than the second pass extremal value.

19. The method of claim 17, further comprising:
updating the second pass extremal value if the interpolated value is smaller than the second pass extremal value.

20. The method of claim 17, further comprising:
updating the threshold if the interpolated value is larger than the threshold.

21. The method of claim 17, further comprising:
updating the threshold if the interpolated value is smaller than the threshold.

22. The method of claim 1, wherein said Reduced Path Octree comprises a plurality of levels.

23. The method of claim 1, wherein said Reduced Path Octree comprises a plurality of levels.

24. The method of claim 1, wherein said Reduced Path Octree includes a predetermined number of levels of the full octree.

25. The method of claim 22, wherein said Reduced Path Octree levels are determined based on the user specified memory consumption limit.

26. The method of claim 22, wherein said Reduced Path Octree levels are determined by the balancing of the efficiency of indexing and the efficiency of the adaptive sampling to improve the rendering performance.

27. The method of claim 1, wherein at each level each octree node of the Reduced Path Octree comprises at least one attributes comprising a Minimum value, a Maximum, a Variance value, and a Gradient value which are calculated using all the voxels covered by the node.

28. The method of claim 27, wherein each node's attributes are calculated using the intensities associated with the node and one-extra-voxel of thickness of padding along all three dimensions to avoid skipping a partialy empty node in error.

29. The method of claim 1, wherein visiting an octree node of the reduced path octree comprises shifting a predetermined number of bits from the volume index according to the level of the octree node.

* * * * *